US012720654B2

(12) United States Patent
Yang et al.

(10) Patent No.: US 12,720,654 B2
(45) **Date of Patent: *Aug. 25, 2026**

(54) BIDIRECTIONAL ILLUMINATED LED BEAD TRIGGERED BY POWER LINE PULSE SIGNALS

(71) Applicant: HANGZHOU YUN LED CHIP PHOTOELECTRICITY TECH. CO., LTD., Hangzhou (CN)

(72) Inventors: Yinghan Yang, Hangzhou (CN); Zixun Zhang, Hangzhou (CN)

(73) Assignee: HANGZHOU YUN LED CHIP PHOTOELECTRICITY TECH. CO., LTD., Hangzhou (CN)

( * ) Notice: Subject to any disclaimer, the term of this patent is extended or adjusted under 35 U.S.C. 154(b) by 24 days.

This patent is subject to a terminal disclaimer.

(21) Appl. No.: 18/822,453

(22) Filed: Sep. 2, 2024

(65) Prior Publication Data

US 2024/0422877 A1 Dec. 19, 2024

Related U.S. Application Data

(63) Continuation of application No. PCT/CN2023/080114, filed on Mar. 7, 2023.

(30) Foreign Application Priority Data

Mar. 8, 2022 (CN) ........................ 202210219097.X

(51) Int. Cl.

| | |
|---|---|
| ***H05B 45/34*** | (2020.01) |
| ***H05B 45/325*** | (2020.01) |
| ***H05B 47/14*** | (2020.01) |
| ***H05B 47/165*** | (2020.01) |
| ***H05B 47/21*** | (2020.01) |

(52) U.S. Cl.

CPC ........... *H05B 45/34* (2020.01); *H05B 45/325* (2020.01); *H05B 47/14* (2020.01); *H05B 47/165* (2020.01); *H05B 47/21* (2020.01)

(58) Field of Classification Search

None

See application file for complete search history.

(56) References Cited

U.S. PATENT DOCUMENTS 5,608,237 A * 3/1997 Aizawa ................ H10D 12/441 257/119
2014/0312378 A1* 10/2014 Hsue ...................... H10H 29/10 438/23
2024/0324086 A1* 9/2024 Yang .................... H05B 47/185

* cited by examiner

*Primary Examiner* — Kenneth B Wells
(74) *Attorney, Agent, or Firm* — Syncoda LLC; Feng Ma

(57) ABSTRACT

A bidirectional illuminated LED bead triggered by power line pulse signals includes a first illumination module trigged by power line pulse signals and a reverse light emitting module. The first illumination module trigged by power line pulse signals and the reverse light emitting module are connected in parallel to the first power line port and the second power line port of the light source. The first illumination module trigged by power line pulse signals includes an LED color light group and an LED driver. When the voltage level at the first power line port is higher than the voltage level at the second power line port, the LED driver drives the LED color light group. Conversely, the reverse light emitting module works. The LED driver includes a reverse current blocking module and an operation module triggered by power line pulses integrated in a same integrated circuit.

14 Claims, 4 Drawing Sheets

BIDIRECTIONAL ILLUMINATED LED BEAD TRIGGERED BY POWER LINE PULSE SIGNALS

CROSS-REFERENCE TO RELATED APPLICATIONS

This is a continuation of International Patent Application No. PCT/CN2023/080114 filed on Mar. 7, 2023, which claims priority to Chinese Patent Application No. 202210219097.X filed on Mar. 8, 2022. The disclosures of the above-referenced applications are hereby incorporated by reference in their entirety.

BACKGROUND

The present invention relates to the field of LED color lights and specifically involves bidirectional illuminated LED beads triggered by power line pulse signals.

The Chinese utility model patent "LED bead with two non-polar pins controlled by internal program" (201620512333.7) achieves bidirectional non-polar illumination LED beads by incorporating a monochromatic light group and a current limiting device on the first mounting platform, and an RGB light group, RGB control chip, and reverse protection device on the second mounting platform.

The Chinese utility model patent "Bidirectional conducting LED bead" (201820838558.0) achieves protection of the internal IC when subjected to reverse voltage input by installing a control IC on the first pin, LED light components and the first reverse protector on the second pin, and the second reverse protector on the first pin. The control IC is connected to the first pin, LED light components, and the first reverse protector, while the LED light components are connected to the second pin, and the second reverse protector is connected to the second pin.

The above-mentioned technologies protect the IC from reverse current and reverse voltage by incorporating external "reverse protection devices" or "reverse protectors" during packaging. However, these technologies require separate devices to be soldered during packaging, which increases the difficulty and error probability of the packaging process, thereby reducing packaging efficiency.

SUMMARY

The present invention achieves a significant reduction in packaging costs and improved packaging efficiency by integrating a reverse current blocking module into the LED driver and integrating it into the same integrated circuit. Furthermore, it enables the expansion of the LED bead's spectral range by only requiring a power line port and a ground line port.

A bidirectional illuminated LED bead triggered by power line pulse signals, comprises:

a first illumination module triggered by power line pulse signals and a reverse light emitting module, wherein said first illumination module triggered by power line pulse signals and said reverse light emitting module are connected in parallel with each other between a first power line port and a second power line port of the LED bead;

said first illumination module triggered by power line pulse signals comprises an LED color light group and an LED driver that drives said LED color light group based on power line pulse signals loaded on power line ports;

when the voltage level at said first power line port is higher than the voltage level at said second power line port, said LED driver drives said LED color light group based on said power line pulse signals loaded on power line ports; when the voltage level at said first power line port is lower than the voltage level at said second power line port, said reverse light emitting module operates.

Said LED driver comprises a reverse current blocking module and an operation module triggered by power line pulses. When the voltage level at said first power line port is higher than the voltage level at said second power line port, said first illumination module triggered by power line pulse signals drives said LED color light group based on said power line pulse signals loaded on said first power line port, or said second power line port, or a combination of both ports. Said reverse current blocking module and said operation module triggered by power line pulses are integrated into a single integrated circuit.

Said first illumination module triggered by power line pulse signals and said reverse light emitting module are sealed by a translucent gel. Said first power line port and said second power line port are led out from said translucent gel by conductors.

It should be understood that the operation of said reverse light emitting module can be in a constant state working mode or a controlled variable state working mode.

By integrating said reverse current blocking module and said operation module triggered by power line pulses into a same integrated circuit, the packaging need for additional components to protect the operation module triggered by power line pulses from reverse current is eliminated. This reduces the complexity of packaging processes such as die bonding and wire bonding, improves packaging efficiency, reduces the likelihood of packaging errors, and lowers the cost of the LED bead.

The input of said reverse current blocking module is connected to said first power line port. The output of said reverse current blocking module is connected to said operation module triggered by power line pulses, and the ground of said operation module triggered by power line pulses is connected to said second power line port. Said operation module triggered by power line pulses drives said LED color light group based on operation results.

As a preferred embodiment, said first illumination module triggered by power line pulse signals is fixed on the first packaging platform. The anode of said first illumination module triggered by power line pulse signals is connected to said first power line port, and the cathode is connected to said second power line port. Said reverse light emitting module is fixed on the second packaging platform. Said anode of said reverse light emitting module is connected to said second power line port, and the cathode is connected to said first power line port.

As a preferred embodiment, said LED color light group can be connected in a common anode configuration, where the cathodes of the LEDs in said LED color light group are connected to the output of said operation module triggered by power line pulses. The common anodes of said LED color light group are connected to the output of said reverse current blocking module, or the common anodes of said LED color light group are connected to the input of said reverse current blocking module. Alternatively, said LED color light group is connected in a common cathode configuration, where the anodes of the LEDs in said LED color light group are connected to the output of said operation module triggered by power line pulses, and the common cathode of said LED color light group is connected to said second power line port.

Said power line pulse signals can be either high-level pulse effective or low-level pulse effective, or a combination of both high-level and low-level pulses. As a preferred embodiment, the low-level of said power line pulse signals is equal to the voltage level at said second power line port. Alternatively, the low-level of said power line pulse signals can be a third level higher than the voltage level at said second power line port.

As a preferred embodiment, a pull-down resistor is connected between the output of said reverse current blocking module and the ground of said operation module triggered by power line pulses.

As a preferred embodiment, said LED color light group comprises red, green, and blue LEDs. The anodes of the red, green, and blue LEDs are connected to said first power line port, and the cathodes are respectively connected to the outputs of said LED driver. The power supply terminal of said LED driver is connected to said first power line port, and the ground of said LED driver is connected to said second power line port.

As a preferred embodiment, said reverse current blocking module is a single device or a combination of multiple devices. Alternatively, said reverse current blocking module is a resistor that limits the reverse current within a range below 500 mA.

As a preferred embodiment, said reverse current blocking module is a unidirectional conductive module, which conducts when the voltage level at the input of said reverse current blocking module is higher than the voltage level at the output, and blocks when the voltage level at the input is lower than the voltage level at the output.

As a preferred embodiment, said unidirectional conductive module is a diode, where the anode of said diode is connected to said first power line port, and the cathode is connected to said operation module triggered by power line pulses. Alternatively, said unidirectional conductive module is an equivalent diode formed by an NPN transistor, where the collector and base of said NPN transistor are connected together and also connected to said first power line port, and the emitter is connected to said operation module triggered by power line pulses. Alternatively, said unidirectional conductive module is an equivalent diode formed by a PNP transistor, where the collector and base of said PNP transistor are connected together and also connected to said operation module triggered by power line pulses, and the emitter is connected to said first power line port.

As a preferred embodiment, said operation module triggered by power line pulses performs calculations based on said power line pulse signals and drives said LED color light group based on calculation results.

It should be understood that said calculation refers to internal state changes within said operation module triggered by power line pulses. Furthermore, said calculation involves arithmetic operations, logical operations, or a combination of arithmetic and logical operations. As a preferred embodiment, said operation module triggered by power line pulses performs pulse counting calculations triggered by said power line pulse signals.

In an alternative embodiment, said operation module triggered by power line pulses performs encoding and decoding calculations triggered by said power line pulse signals, where the pulse width corresponds to encoded information.

The encoded information can consist of a high-level signal of a specific length, a low-level signal of a specific length, or a combination of high-level and low-level signals of specific lengths, representing corresponding logical encoded information.

Furthermore, the pulse width corresponding to the encoded information should be understood as different lengths of high-level signals, different lengths of low-level signals, or a combination of different lengths of high-level and low-level signals, representing different logical encoded information. As a preferred embodiment, a high pulse shorter than 100 us corresponds to logic 0, while a high pulse equal to or longer than 100 us corresponds to logic 1. Similarly, a low pulse shorter than 100 us corresponds to logic 0, while a low pulse equal to or longer than 100 us corresponds to logic 1.

In another embodiment, said operation module triggered by power line pulses performs modulation and demodulation calculations based on the frequency of the current or voltage in said power line pulse signals and drives said LED color light group based on modulation and demodulation results.

Furthermore, it should be understood that the operation triggered by said pulse signals can be triggered by a single pulse signal or a combination of multiple pulse signals.

As a preferred embodiment, said reverse light emitting module is a white LED. In another embodiment, said reverse light emitting module can be a warm white LED obtained by using a blue light chip with fluorescent powder.

In another embodiment, said reverse light emitting module is a second illumination module triggered by power line pulse signals. When the voltage level at said first power line port is lower than the voltage level at said second power line port, said second illumination module triggered by power line pulse signals drives the LED color light group of said second illumination module triggered by power line pulse signals based on the power line pulse signal loaded on power line ports. As a preferred embodiment, the structure of said second illumination module triggered by power line pulse signals is the same as that of said first illumination module triggered by power line pulse signals. Alternatively, said second illumination module triggered by power line pulse signals may have a different structure from said first illumination module triggered by power line pulse signals.

As a preferred embodiment, the LED color light group of said second illumination module triggered by power line pulse signals is of a different color scheme from the LED color light group of said first illumination module triggered by power line pulse signals. The LED color light group of said second illumination module triggered by power line pulse signals can be in a warm white, golden yellow, or cool white color scheme, as for a preferred embodiment.

In some embodiments, one terminal of the LED can be connected to said first power line port or said second power line port using conductive silver paste.

As a preferred embodiment, said operation module triggered by power line pulses comprises:

- a pulse-triggered operation unit to perform calculations triggered by said pulse signal input from power line ports and outputs calculation results;
- a charging unit to provide power supply voltage to said pulse-triggered operation unit based on said pulse signals from power line ports; said charging unit charges when the pulse signal is at a high level and discharges when the pulse signal is at a low level;
- an initialization unit to initialize said pulse-triggered operation unit based on the power supply voltage.

In the present invention, the functional units of said operation module triggered by power line pulses can be integrated into an operational chip.

In the present invention, through initialization, said pulse trigger operation unit can be set to any number, and the setting is usually set to "zero" (i.e., cleared).

When said power line pulse signals are at a high level, said charging unit charges; when the level provided by the charging unit reaches a high level, said pulse trigger operation unit and said initialization unit are successfully powered on.

Said pulse-triggered operation unit performs counting operations, arithmetic operations, logical operations, or shift operations. Alternatively, said pulse-triggered operation unit performs combinations of operations such as counting, arithmetic, logic, and shift operations.

As a preferred embodiment, said pulse-triggered operation unit is a pulse counting unit that counts the pulses from power line ports and outputs count result.

Said pulse counting unit comprises a plurality of flip-flops, and the count results are output at the output ports of said plurality of flip-flops.

As a preferred embodiment, said flip-flops are D-flip-flops.

As a preferred embodiment, said pulse counting unit comprises a plurality of D-flip-flops in serial, and the count results are output at the output ports of the D-flip-flops. The configuration is as follows:

- the clock signal input port of the first D-flip-flop is connected to the power line; among adjacent D-flip-flops, the clock signal input port of the latter D-flip-flop is connected to the inverted output port of the previous D-flip-flop;
- the reset ports of each D-flip-flop are connected to said initialization unit, and the inverted output port of each D-flip-flop are connected to the triggering port of the previous D-flip-flop.

The present invention provides a bidirectional illuminated LED bead triggered by power line pulse signals. By incorporating a reverse current blocking module inside the LED driver and integrating it into the same integrated circuit, the packaging cost is significantly reduced, packaging efficiency is improved, and it allows for expanding the spectral range of the LED bead with just the power line and ground connection.

DETAILED DESCRIPTION

In the following, the present invention will be further described in detail with reference to the drawings and specific embodiments.

Embodiment 1

Figure 1:
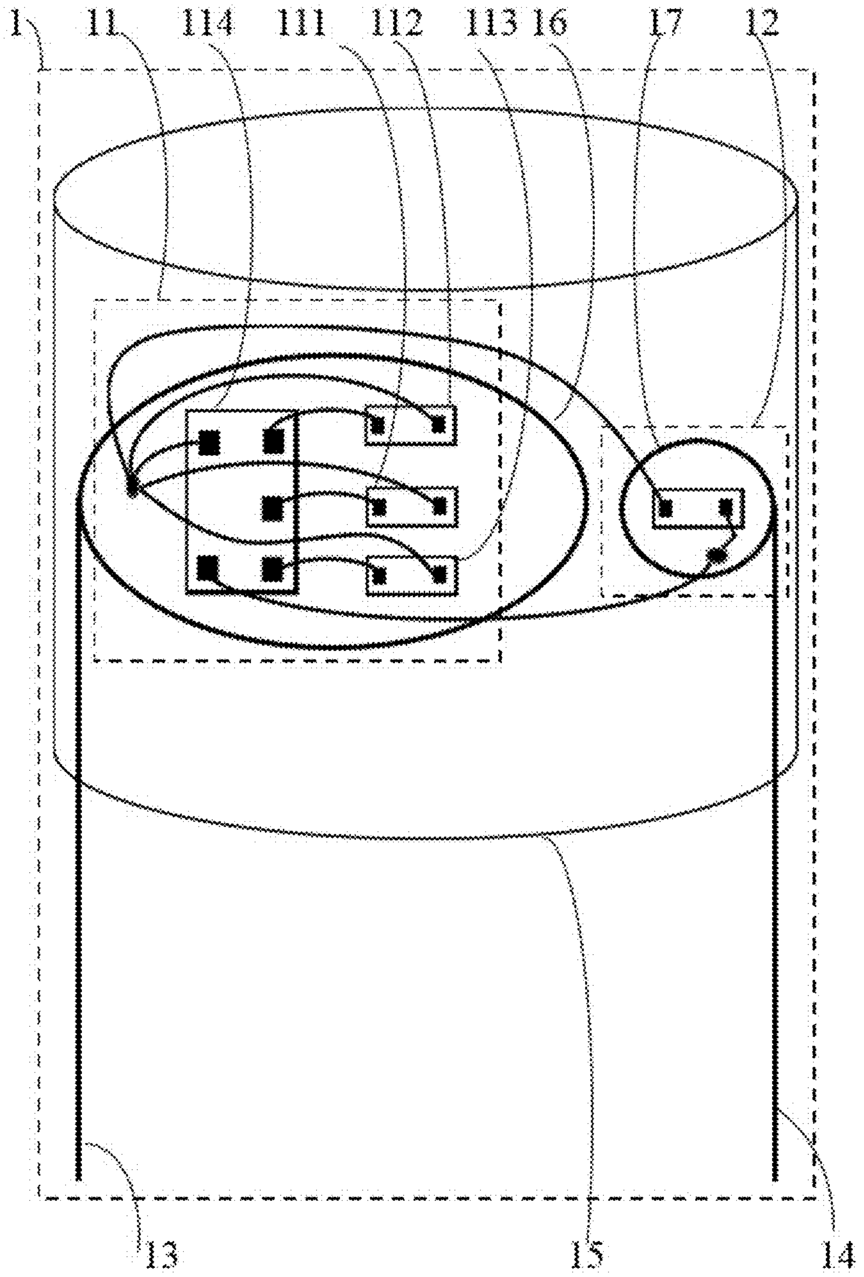
FIG. 1 illustrates a DIP bidirectional illuminated LED bead triggered by power line pulse signals in embodiment 1.

As shown in FIG. 1, the embodiment provides a DIP (Dual In-line Package) bidirectional illuminated LED bead triggered by power line pulse signals 1, comprises:

- a first illumination module triggered by power line pulse signals 11 and a reverse light emitting module 12, which are connected in parallel with the first power line port 13 and the second power line port 14 of the bidirectional illuminated LED bead;
- the LED color light group of the first illumination module triggered by power line pulse signals 11 comprises a red light-emitting diode (LED) 111, a green LED 112, and a blue LED 113; when the voltage level at the first power line port 13 is higher than the voltage level at the second power line port 14, the LED driver 114 drives the red LED 111, green LED 112, and blue LED 113 based on the power line pulse signals loaded from power line ports; when the voltage level at the first power line port 13 is lower than the voltage level at the second power line port 14, the reverse light emitting module 12 operates.

The first illumination module triggered by power line pulse signals 11 and the reverse light emitting module 12 are sealed by a transparent gel 15, and the first power line port 13 and the second power line port 14 are led out by conductors from the transparent gel 15.

The anodes of the red LED 111, green LED 112, and blue LED 113 in this embodiment are connected together and connected to the first power line port 13, while the cathodes of the red LED 111, green LED 112, and blue LED 113 are respectively connected to the output of the LED driver 114. In this embodiment, the LED driver 114, red LED 111, green LED 112, and blue LED 113 are fixed on the first packaging platform 16, while the reverse light emitting module 12 is fixed on the second packaging platform 17.

Figure 2:
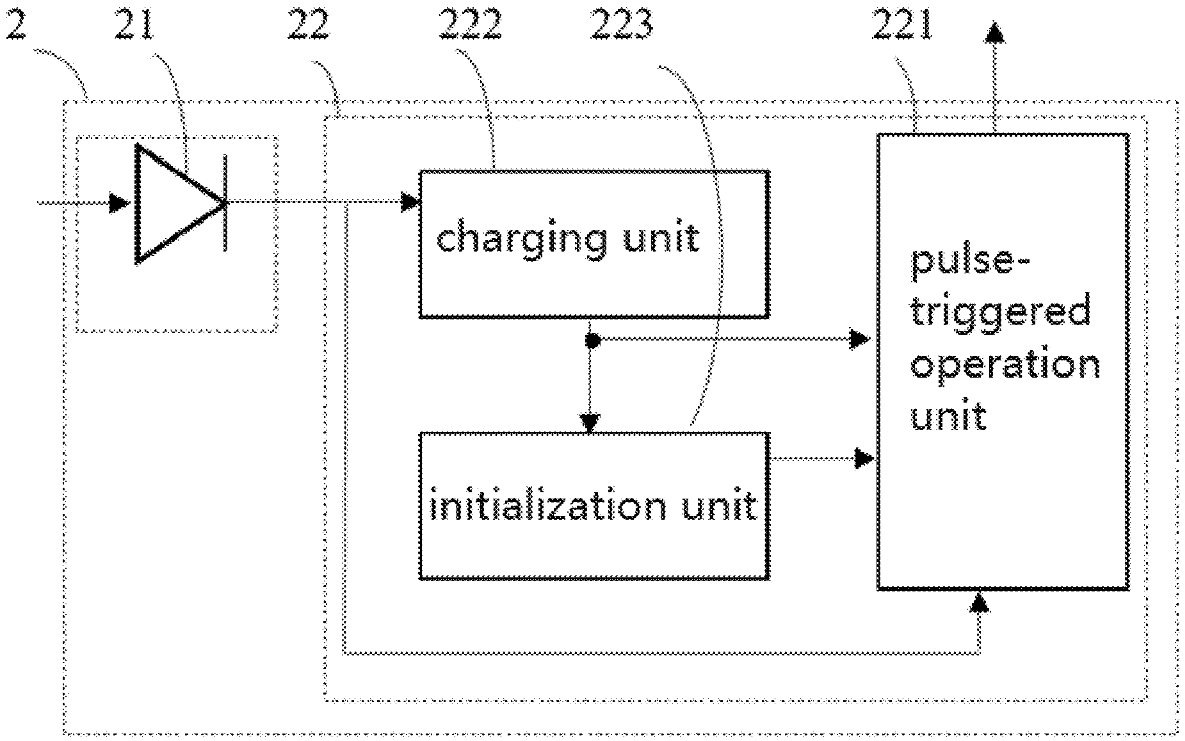
FIG. 2 illustrates the operation module triggered by power line pulses in embodiment 1.

As shown in FIG. 2, the LED driver 114 (2) comprises: a reverse current blocking module 21; an operation module triggered by power line pulses 22; the input of the reverse current blocking module 21 is connected to the first power line port 13; the output of the reverse current blocking module 21 is connected to the operation module triggered by power line pulses 22; the operation module triggered by power line pulses 22 drives the LED color light group based on operation results.

In this embodiment, the reverse current blocking module 21 is a diode. The anode of the diode is connected to the first power line port 13, and the cathode is connected to the operation module triggered by power line pulses 22.

In this embodiment, the operation module triggered by power line pulses 22 comprises: a pulse-triggered operation unit 221, which performs operation triggered by the pulse signals from power line ports and outputs the operation result; a charging unit 222, which provides power supply voltage to the pulse-triggered operation unit based on the pulse signals from power line ports, which charges when the pulse signal is high and discharges when the pulse signal is low; and an initialization unit 223, which initializes the pulse-triggered operation unit based on the provided power supply voltage.

In this embodiment, the operation module triggered by power line pulses 22 performs pulse counting calculations triggered by the pulse signals and drives the LED color light group based on calculation results. The reverse current blocking module 21 and the operation module triggered by power line pulses 22 are integrated into a single integrated circuit.

In this embodiment, the reverse light emitting module 12 is a warm white LED. The anode of the LED is connected to the second power line port 14, and the cathode is connected to the first power line port 13.

Embodiment 2

Figure 3:
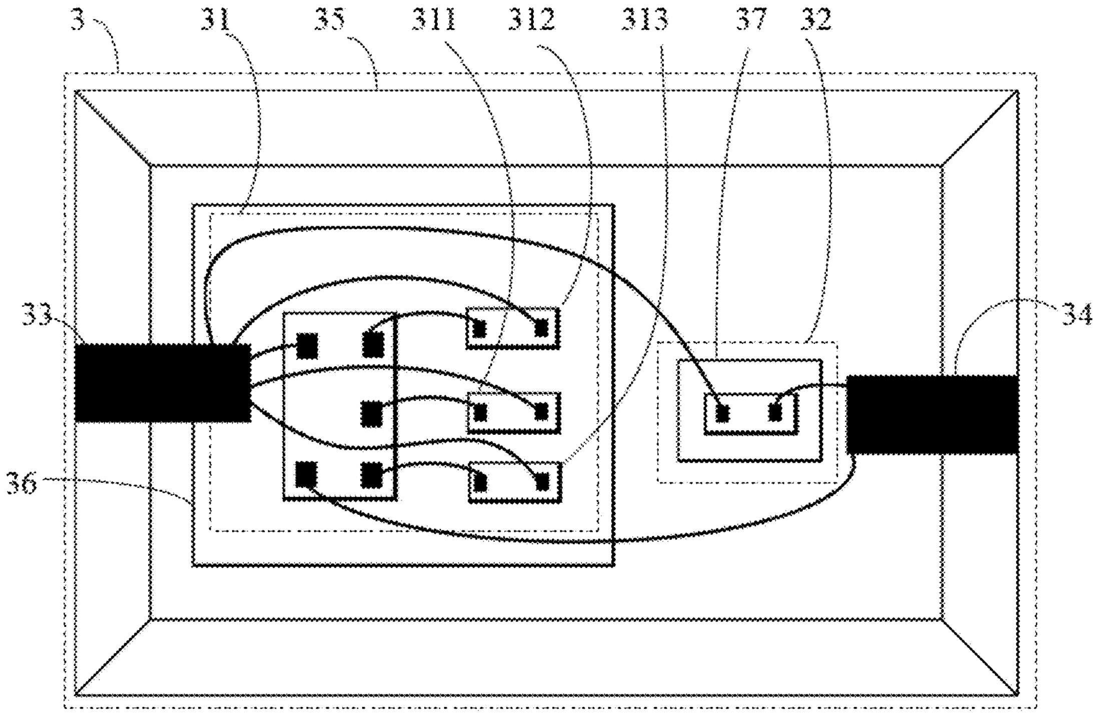
FIG. 3 illustrates an SMT bidirectional illuminated LED bead triggered by power line pulse signals in embodiment 2.

As shown in FIG. 3, Embodiment 2 provides an SMT (Surface Mount Technology) bidirectional illuminated LED bead triggered by power line pulse signals 3, which comprises: a first illumination module triggered by power line pulse signals 31 and a reverse light emitting module 32, which are connected in parallel with the first power line port 33 and the second power line port 34 of the illuminated LED bead.

The LED color light group of the first illumination module triggered by power line pulse signals 31 comprises a red light-emitting diode (LED) 311, a green LED 312, and a blue LED 313. When the voltage level at the first power line port 33 is higher than the voltage level at the second power line port 34, the LED driver 34 drives the red LED 311, green LED 312, and blue LED 313 based on the power line pulse signals loaded from power line ports. When the voltage level at the first power line port 33 is lower than the voltage level at the second power line port 34, the reverse light emitting module 32 operates.

The first illumination module triggered by power line pulse signals 31 and the reverse light emitting module 32 are sealed by a transparent gel 35, and the first power line port 33 and the second power line port 34 are led out by conductors from the transparent gel 35. In this embodiment, the first illumination module triggered by power line pulse signals 31 is fixed on the first packaging platform 36, while the reverse light emitting module 32 is fixed on the second packaging platform 37.

The LED driver 34 is shown in FIG. 2.

Embodiment 3

Figure 4:
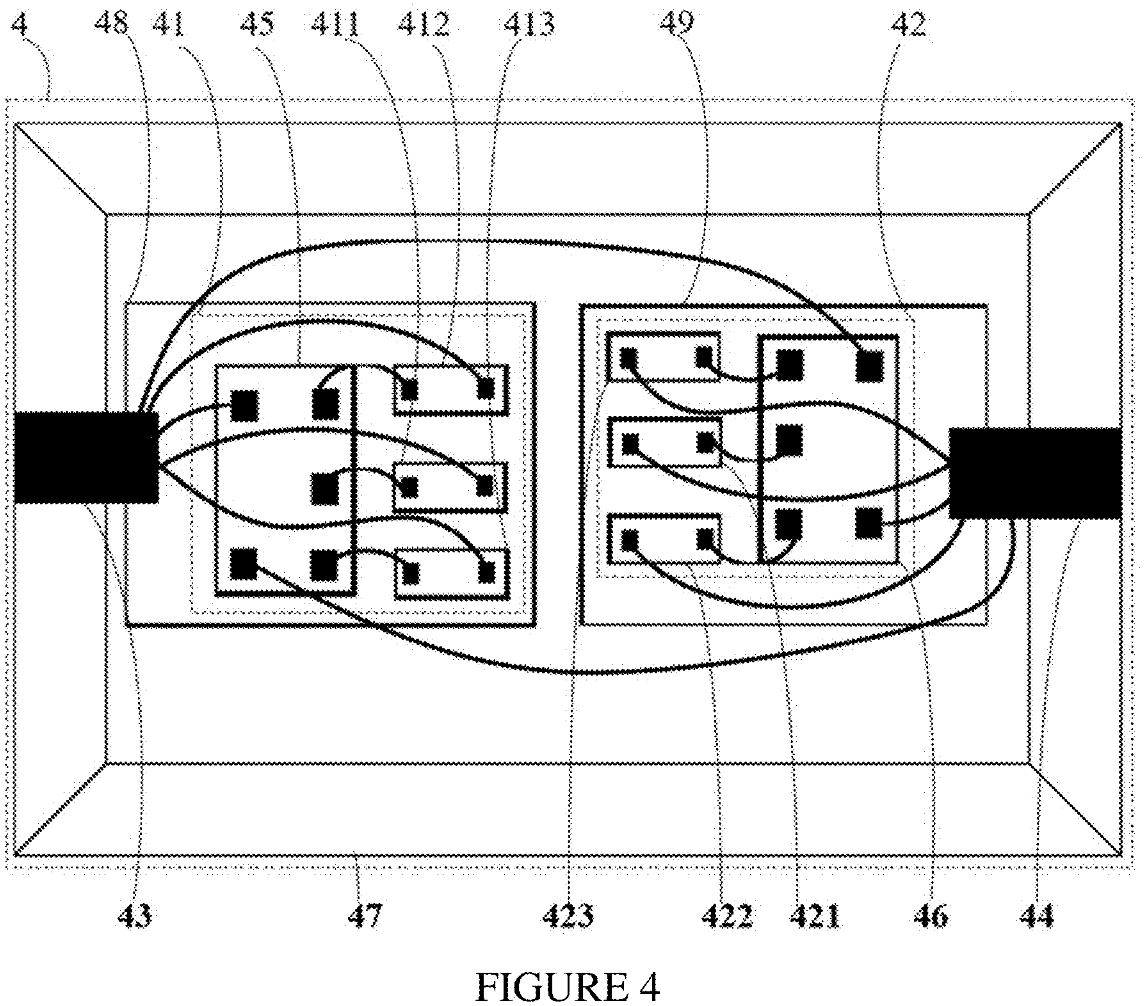
FIG. 4 shows another SMT bidirectional illuminated LED bead triggered by power line pulse signals in embodiment 3.

As shown in FIG. 4, Embodiment 3 provides an SMT bidirectional illuminated LED bead triggered by power line pulse signals 4, which comprises: a first illumination module triggered by power line pulse signals 41 and a second illumination module triggered by power line pulse signals 42, which are connected in parallel with the first power line port 43 and the second power line port 44 of the illuminated LED bead.

The LED color light group of the first illumination module triggered by power line pulse signals 41 comprises a red LED 411, a green LED 412, and a blue LED 413. When the voltage level at the first power line port 43 is higher than the voltage level at the second power line port 44, the LED driver 45 of the first illumination module triggered by power line pulse signals 41 drives the red LED 411, green LED 412, and blue LED 413 based on the power line pulse signals loaded from power line ports.

The LED color light group of the second illumination module triggered by power line pulse signals 42 comprises a warm white LED 421, a cool white LED 422, and a golden light LED 423. When the voltage level at the second power line port 44 is higher than the voltage level at the first power line port 43, the LED driver 46 of the second illumination module triggered by power line pulse signals 42 drives the warm white LED 421, cool white LED 422, and golden light LED 423 based on the power line pulse signals loaded from power line ports.

The first illumination module triggered by power line pulse signals 41 and the second illumination module triggered by power line pulse signals 42 are sealed by a transparent gel 47, and the first power line port 43 and the second power line port 44 are led out by conductors from the transparent gel 47. In this embodiment, the first illumination module triggered by power line pulse signals 41 is fixed on the first packaging platform 48, while the second illumination module triggered by power line pulse signals 42 is fixed on the second packaging platform 49.

The present invention drives LED color light groups of different color systems through a first illumination module triggered by power line pulse signals and a reverse light emitting module, resulting in a wide range of color spectrum effects. Compared to some implementations, the light source of the present invention is powered bidirectionally. By using forward current and being triggered by the power line pulse signal, one spectrum range is obtained. By adding reverse current, an additional spectrum range is achieved. With only two power line ports, the spectrum range of the LED bead is significantly increased.

The specific embodiments described above provide a detailed explanation of the technical solution and beneficial effects of the present invention. It should be understood that the embodiments described above are merely the preferred embodiments of the present invention and are not intended to limit the scope of the present invention. Any modifications, additions, or equivalent replacements made within the scope of the principles of the present invention should be included within the protection scope of the present invention.

The invention claimed is:

1. A bidirectional illuminated LED bead triggered by power line pulse signals, the illuminated LED bead comprising:

a first illumination module triggered by the power line pulse signals and a reverse light emitting module, wherein said first illumination module triggered by the power line pulse signals and said reverse light emitting module are connected in parallel with each other between a first power line port and a second power line port of the LED bead;

said first illumination module triggered by the power line pulse signals comprises an LED color light group and an LED driver that drives said LED color light group based on the power line pulse signals loaded on power line ports;

wherein when a voltage level at said first power line port is higher than a voltage level at said second power line port, said LED driver drives said LED color light group based on said power line pulse signals loaded on the power line ports; and when the voltage level at said first power line port is lower than the voltage level at said second power line port, said reverse light emitting module operates;

wherein said LED driver comprises a reverse current blocking module and an operation module triggered by the power line pulse signals; when the voltage level at said first power line port is higher than the voltage level at said second power line port, said first illumination module triggered by the power line pulse signals drives said LED color light group based on said power line pulse signals loaded on said first power line port, or said second power line port, or a combination of both the first and the second ports; said reverse current blocking module and said operation module triggered by the power line pulse signals are integrated into a single integrated circuit; and said first illumination module triggered by the power line pulse signals and said reverse light emitting module are sealed by a translucent gel; and said first power line port and said second power line port are led out from said translucent gel by conductors.

2. The illuminated LED bead of claim 1, wherein said first illumination module triggered by the power line pulse signals is fixed on a first packaging platform, an anode of said first illumination module triggered by the power line pulse signals is connected to said first power line port, and a cathode of said first illumination module is connected to said second power line port; said reverse light emitting module is fixed on a second packaging platform, an anode of said reverse light emitting module is connected to said second power line port, and a cathode of said reverse light emitting module is connected to said first power line port.

3. The illuminated LED bead of claim 2, wherein said LED color light group comprises red, green, and blue LEDs; anodes of the red, green, and blue LEDs are connected to said first power line port, and cathodes of the red, green, and blue LEDs are respectively connected to outputs of said LED driver; a power supply terminal of said LED driver is connected to said first power line port, and a ground of said LED driver is connected to said second power line port.

4. The illuminated LED bead of claim 3, wherein said reverse current blocking module is a unidirectional conductive module which conducts when a voltage level at an input of said reverse current blocking module is higher than a voltage level at an output of said reverse current blocking module, and which blocks when the voltage level at the input of said reverse current blocking module is lower than the voltage level at the output of said reverse current blocking module.

5. The illuminated LED bead of claim 4, wherein said unidirectional conductive module is a diode, wherein an anode of said diode is connected to said first power line port, and a cathode of said diode is connected to said operation module triggered by the power line pulse signals; alternatively, said unidirectional conductive module is an equivalent diode formed by an NPN transistor, where a collector and a base of said NPN transistor are connected together and also connected to said first power line port, and an emitter of said NPN transistor is connected to said operation module triggered by the power line pulse signals; alternatively, said unidirectional conductive module is an equivalent diode formed by a PNP transistor, where a collector and a base of said PNP transistor are connected together and also connected to said operation module triggered by the power line pulse signals, and an emitter of said PNP transistor is connected to said first power line port.

6. The illuminated LED bead of claim 5, wherein said operation module triggered by the power line pulse signals performs calculations based on said power line pulse signals and drives said LED color light group based on calculation results.

7. The illuminated LED bead of claim 6, wherein said calculations include arithmetic operations, logical operations, or a combination of arithmetic and logical operations.

8. The illuminated LED bead of claim 5, wherein said operation module triggered by the power line pulse signals performs encoding and decoding calculations triggered by said power line pulse signals, wherein a pulse width corresponds to encoded information.

9. The illuminated LED bead of claim 8, wherein said encoded information comprises a high-level signal of a specific length, a low-level signal of a specific length, or a combination of high-level and low-level signals of specific lengths, representing corresponding logical encoded information.

10. The illuminated LED bead of claim 5, wherein said operation module triggered by the power line pulse signals performs modulation and demodulation calculations based on a frequency of a current or a voltage in said power line pulse signals and drives said LED color light group based on modulation and demodulation results.

11. The illuminated LED bead of claim 5, wherein a low-level of said power line pulse signals is equal to the voltage level at said second power line port.

12. The illuminated LED bead of claim 5, wherein a low-level of said power line pulse signals is a third level higher than the voltage level at said second power line port.

13. The illuminated LED bead of claim 5, wherein said reverse light emitting module comprises a white LED.

14. The illuminated LED bead of claim 5, wherein said reverse light emitting module is a second illumination module triggered by the power line pulse signals.

* * * * *